UNITED STATES PATENT OFFICE.

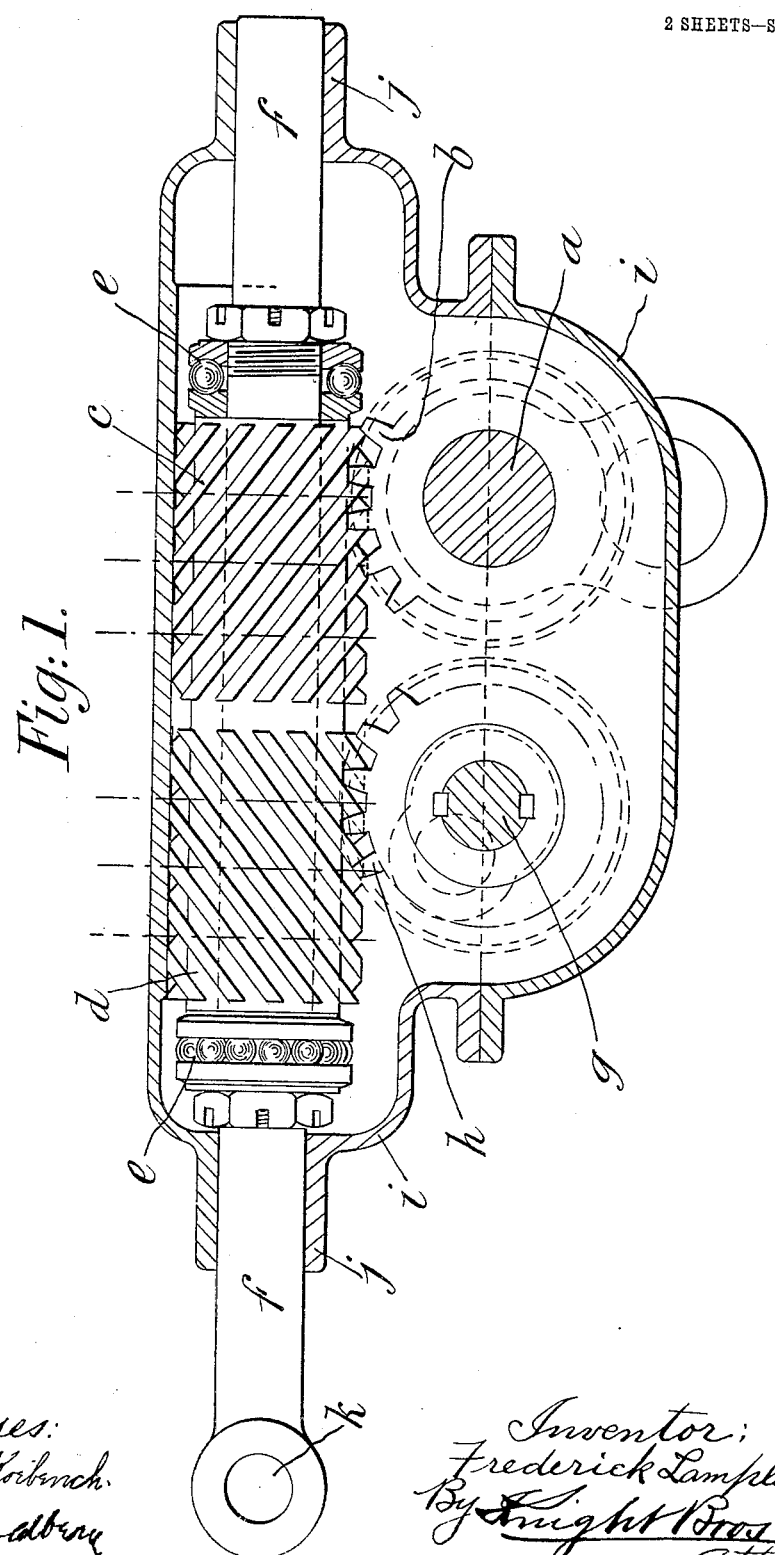

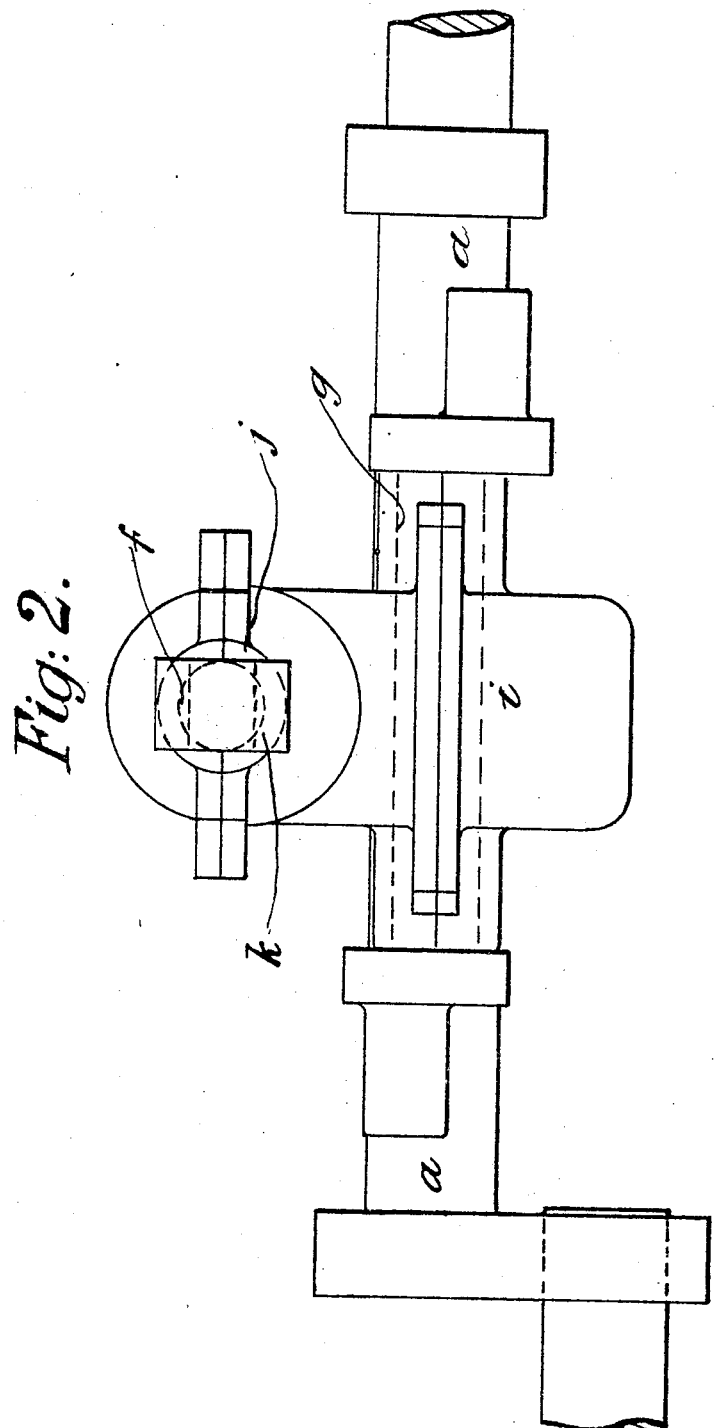

FREDERICK LAMPLOUGH, OF WILLESDEN, ENGLAND.

VALVE-GEAR MECHANISM.

No. 805,562.        Specification of Letters Patent.        Patented Nov. 28, 1905.

Application filed March 22, 1905. Serial No. 251,452.

*To all whom it may concern:*

Be it known that I, FREDERICK LAMPLOUGH, a subject of the King of Great Britain, residing at Willesden, in the county of Middlesex, England, have invented certain new and useful Valve-Gear Mechanism, of which the following is a full, clear, and exact description.

The invention relates to improvements upon that class of mechanism for operating the valves of steam and gas engines and the like in which a gear-wheel on the engine crank-shaft communicates motion to the shaft carrying the valve-operating cranks, eccentrics, or cams by means of movable intermediate gearing and a gear-wheel fixed on said valve-operating shaft, whereby the relative positions of the valve-operating cranks, eccentrics, or cams with relation to the engine crank-shaft can be readily varied; and my invention consists in a simple form of apparatus in which only four gear-wheels are employed.

I will describe my invention by the aid of the accompanying drawings, in which—

Figure 1 is a longitudinal section, and Fig. 2 an end elevation, of one form of my improved apparatus.

$a$ is the engine crank-shaft, on which is keyed a skew-toothed or screw-threaded wheel $b$, which latter gives motion to a pair of right and left handed skew or screw threaded wheels $c\,d$ by gearing with the wheel $c$. These wheels $c\,d$, as shown in the drawings, are formed of one solid piece fitted at the ends with ball thrust-bearings $e$ and are mounted on a non-rotating shaft or rod $f$, which they are bored to fit. These wheels $c\,d$ may, however, be formed separately and fixed on a sleeve fitting the shaft or rod $f$, or they may be fixed or formed on a rotating sliding shaft. The left-hand skew or screw threaded wheel $d$ gives motion to the shaft $g$, carrying the valve-cranks, eccentrics, or cams, by gearing with a skew-toothed or screw-threaded wheel $h$, fixed on such shaft $g$. It will be evident that it is immaterial which of the wheels $c\,d$ is right or left handed so long as they are the reverse of each other and the wheels $b$ and $h$ are respectively formed to gear therewith. The whole of the gearing is inclosed in an oil bath or casing $i$, and the shaft or rod $f$ works through bearings $j$, formed at the ends of said casing. One end of the shaft or rod $f$, as shown in the drawings, has an eye $k$, by which and by suitable connections it is connected to the hand-lever of the engine, or the endwise position of such shaft $f$ may be controlled by a governor.

In the case of the wheels $c\,d$ being fixed or formed on a sliding rotating shaft such shaft would be moved endwise by a fork-lever. Thus by moving the shaft or rod $f$ endwise in its bearings the gearing will cause the valve-cranks, eccentrics, or cams to assume different relations with respect to the engine-cranks, and thus cause the engine to have an earlier or later cut-off and reverse. In some cases it is preferable to place the wheels $b\,h$ on shafts parallel with the axis of the wheels $c\,d$.

Throughout the specification and claim when "skew" or "screw wheel" is mentioned I wish to have it understood that I do not limit myself to either of these specific constructions of gears; but, on the contrary, any equivalent may be substituted therefor and still come within the scope of my invention—for example, a worm-gear, &c.

Having fully described my invention, what I claim, and desire to secure by Letters Patent, is—

In mechanism for operating the valves of steam and gas engines and the like, the combination of a screw-toothed wheel fixed on the engine crank-shaft, a screw-toothed wheel of contrary direction to the above fixed on the shaft carrying the valve-cranks, eccentrics, a pair of right and left handed screw-toothed wheels fixed and rotating together, on a counter-shaft, one of such wheels gearing with the wheel on the engine crank-shaft and the other with the wheel on the shaft carrying the valve-cranks, eccentrics, and means for moving said conical pair of right and left handed screw-toothed wheels endwise, substantially as herein shown and described.

In witness whereof I have hereunto set my hand in presence of two witnesses.

FREDERICK LAMPLOUGH.

Witnesses:
   B. J. B. MILLS,
   CLAUDE K. MILLS.